July 12, 1960

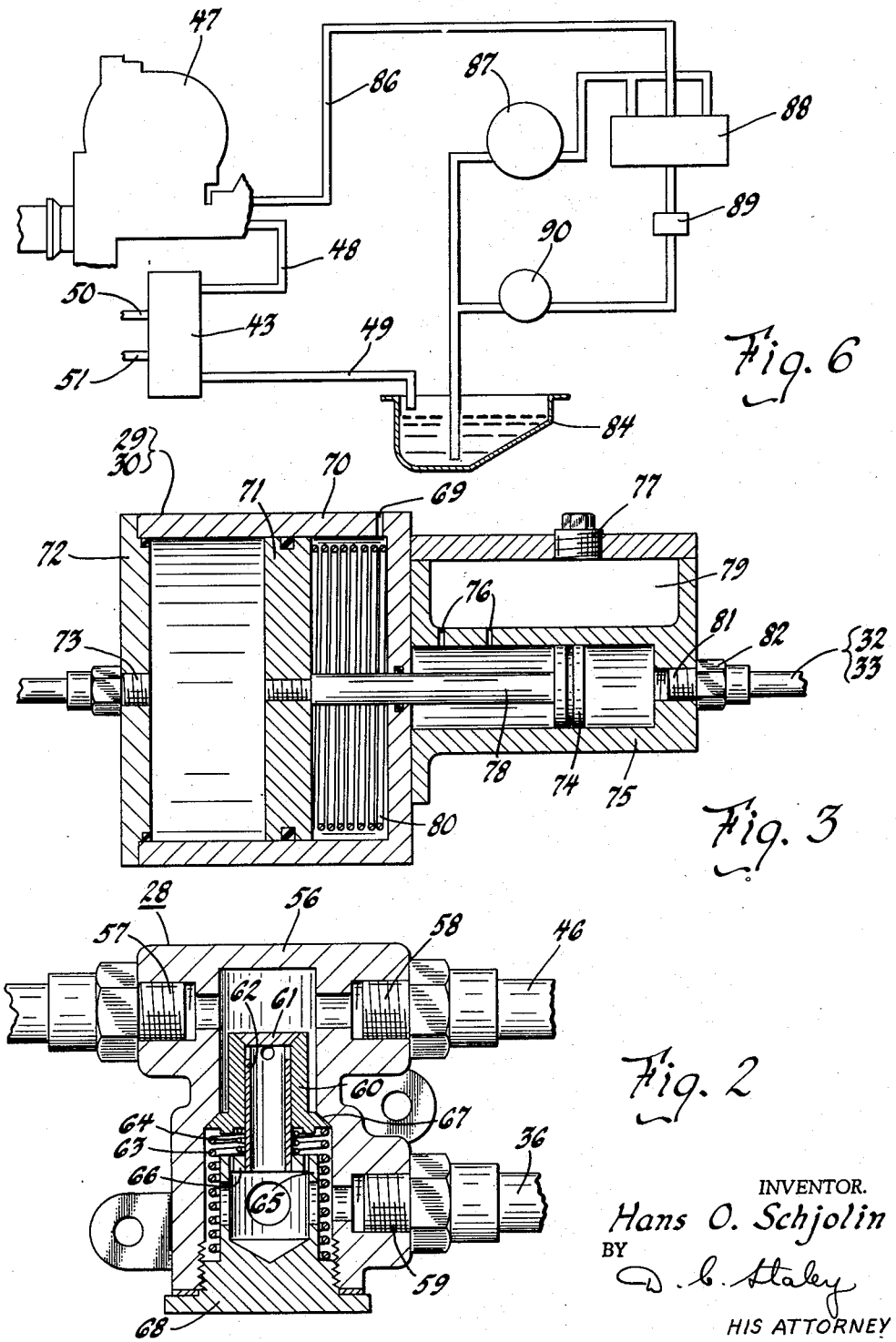

H. O. SCHJOLIN 2,944,618

HYDRAULIC COOLING SYSTEM FOR BRAKES, TRANSMISSION, TORQUE
CONVERTER AND DIFFERENTIAL

Filed March 3, 1958

INVENTOR.
Hans O. Schjolin
BY
HIS ATTORNEY

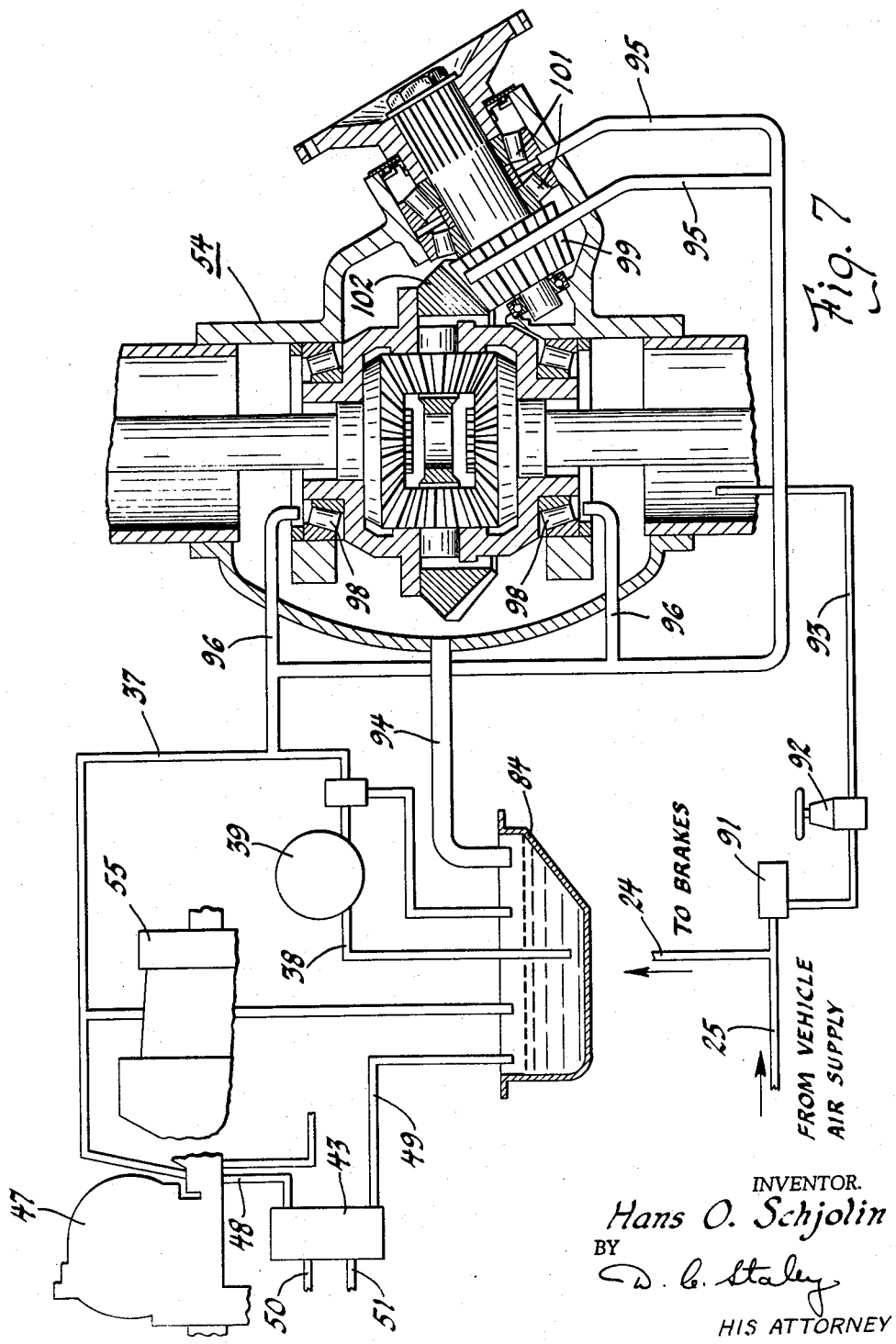

United States Patent Office 2,944,618
Patented July 12, 1960

2,944,618

HYDRAULIC COOLING SYSTEM FOR BRAKES, TRANSMISSION, TORQUE CONVERTER AND DIFFERENTIAL

Hans O. Schjolin, Birmingham, Mich., assignor to General Motors Corporation, Detroit, Mich., a corporation of Delaware Filed Mar. 3, 1958, Ser. No. 718,670

6 Claims. (Cl. 180—54)

This invention relates to a hydraulic cooling system, and more particularly to a common hydraulic cooling system for brakes, the transmission and torque converter, and the differential.

With the greater demand for heavy-duty trucks and for the increased load and increased speed of this type of vehicle, it becomes necessary to provide a cooling means for the various working parts of the vehicle. The brakes of the truck dissipate considerable heat while being operated in congested areas or mountainous terrain because of the necessity of frequent use of the brakes. It, therefore, may become necessary to have a hydraulic means of absorbing the heat and carrying it away to another portion of the car to provide a cool operating condition for the brakes. The differential, transmission, and torque converter also dissipate considerable heat under heavy load where acceleration and deceleration of the vehicle are necessary. A cooling means for these parts also becomes desirable and a hydraulic system may be the most practical means when operated with a heat exchanger. This heat exchanger may be operated in conjunction with the radiator fluid of the vehicle to provide adequate cooling of the hydraulic fluid.

It is the object of this invention to provide hydraulic cooling means for cooling the hydraulic brakes, the differential, the transmission and the torque converter. It is also the object of this invention to provide a common cooling means such as a heat exchanger for these hydraulic cooling systems.

It is a further object of this invention to provide a common source of air pressure for scavenging a combined lubricating and cooling fluid in the differential, for actuating the vehicle brakes, and for a pressure control means for circulating a hydraulic brake cooling fluid when the hydraulic brakes are actuated.

It is a further object of this invention to provide reservoir means and a common heat exchanger for the brake cooling fluid system, the combined lubricating and cooling system of the differential, and the transmission and torque converter fluid system.

Further objects and advantages of the present invention will be apparent from the folowing description, reference being had to the accompanying drawings wherein preferred embodiments of the present invention are clearly shown.

In the drawings:

Fig. 2 is a cross-section view of the pressure distribution valve which controls the proportioning of air pressure to the front hydraulic master cylinder and the rear hydraulic master cylinder.

Fig. 3 is a cross-section view of the air-operated hydraulic master cylinder.

Fig. 6 is a schematic diagram of the torque converter as indicated by 47 of Fig. 1.

Fig. 7 is a schematic diagram of the transmission and torque converter, the heat exchanger, the fluid pump and conduit means for forced cooling and lubrication of the differential. An air pressure regulating valve is also disclosed for scavenging the cooling and lubricating fluid from the differential.

The hydraulic system for cooling the brakes may be operated in conjunction with a fluid-cooled brake such as disclosed and illustrated in the copending application, filed on February 2, 1958, Serial No. 714,774, which is an application of the same assignee.

Figure 1:
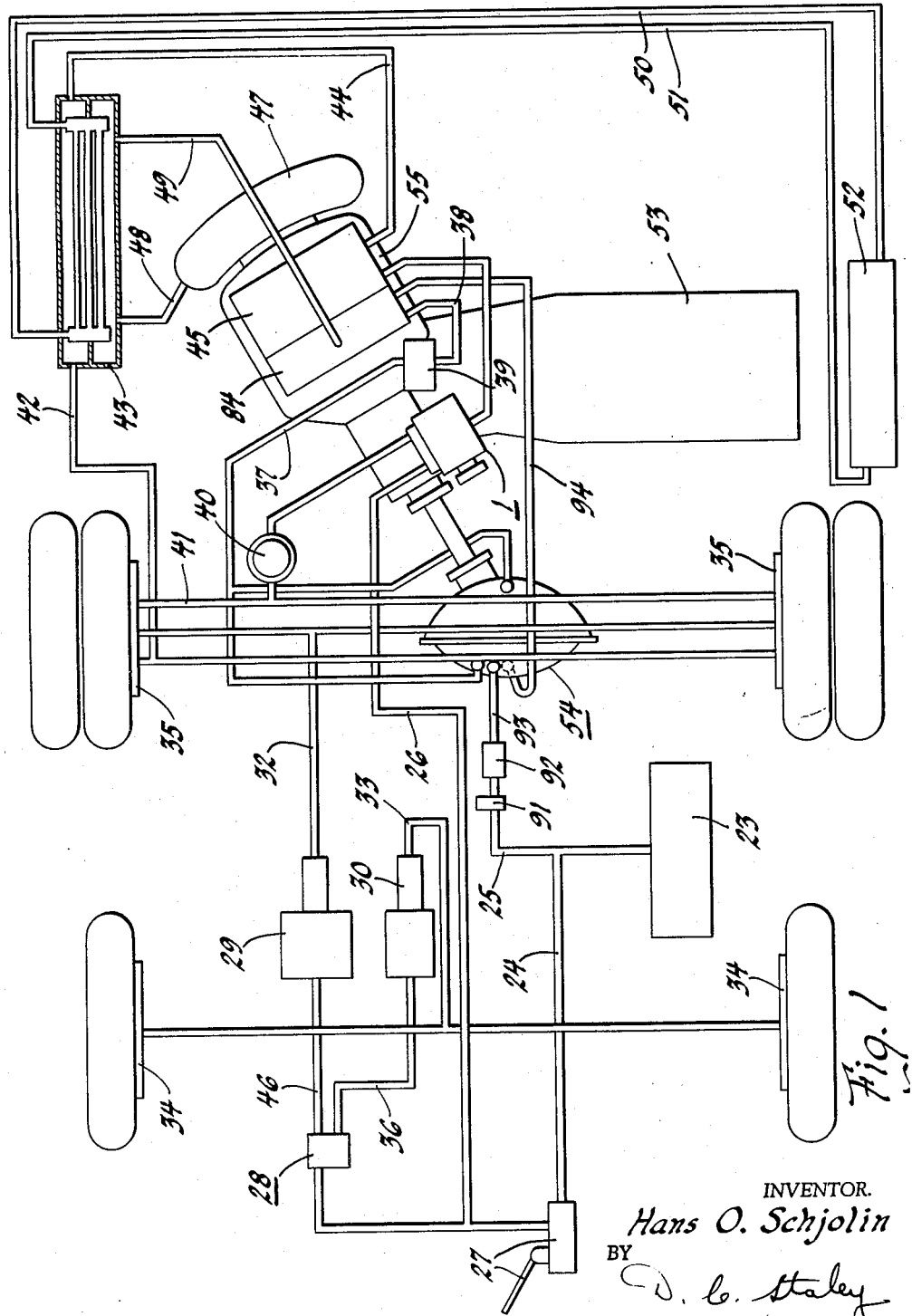
Fig. 1 is a schematic diagram of all the fluid systems for cooling the brakes, the differential, the transmission and torque converter. The diagram also shows the controls for operating said fluid systems and providing circulation of fluid through the systems.

Fig. 1 discloses the layout and schematic diagram of the pressure systems. A fluid pump is indicated at 1 with a conduit means connecting said pump to a filter as indicated at 40. Conduit means 41 are also provided between the filter and the brakes. Conduit 42 is connected to the heat exchanger 43. Further conduit means 44 are connected to the heat exchanger 43 which also connect the common reservoir 45 by a connection to the fluid pump 1. The fluid pump as indicated at 1 will be further described later in the application. This pump 1 is controlled by a dashpot which operates the by-pass valve which regulates the circulation of the fluid through the cooling system or by means of a direct return into the pump 1. This dashpot is operated by means of air pressure through conduit 26. Conduit 26 is connected to a valve operated by brake pedal 27. Brake pedal 27 operates a valve in the conduit which is directly connected to the air reservoir 23 by means of a conduit 24. This air reservoir is also connected through conduit 24 through the valve 27 to a pressure distribution valve as indicated at 28. The pressure distribution valve 28 controls the actuation of the rear master hydraulic cylinder 29 and the front master hydraulic cylinder 30 through a conduit means. The front hydraulic master cylinder operates through conduit means 33 which is connected to the front hydraulic wheel cylinder as indicated at 34. The rear hydraulic master cylinder 29 is directly connected to conduit 32 which feeds into the rear hydraulic wheel cylinders 35. A fluid reservoir 79 is provided for each hydraulic master cylinder 29 and 30.

The air reservoir 23 is also connected by means of conduit 25 to a differential 54. An air pressure regulating valve 92 is placed in this conduit means 25 for controlling the air pressure within the differential 54. A pump 39 is placed in connection with the reservoir 84 for forced lubrication and cooling of the differential 54 through the conduit 37. A return for the cooling and lubricating fluid is provided by conduit 94 which connects the differential 54 to the reservoir 84.

The torque converter 47 and transmission 55 is connected to the heat exchanger 43 by means of conduits 48 and 49.

The heat exchanger is also connected to the reservoir 45 and provides circulation of the brake cooling fluid. This heat exchanger 43 is also connected to radiator 52 by means of conduits 50 and 51. This provides a means of circulating the radiator fluid for heat exchange from the cooling and lubricating fluid in the heat exchanger.

Fig. 2 discloses the cross section of the pressure distribution valve as indicated by 28 of Fig. 1.

The conduit means between the brake pedal valve 27 and the pressure distribution valve 28 enters the valve at treadle valve inlet 57. The air inlet 57 is directly connected then to rear brake outlet at 58. A chamber connects this inlet and outlet within housing 56. The housing 56 also extends downward to enclose a spring-operated valve. This valve 60 is mounted against a frustro-conical seat 67. A cover plate 61 is mounted on the upper end of the valve 60. The cover plate 61 is connected to an internal sleeve and operates in fixed relation to said internal sleeve 62. Valve 60 operates in movable relation to the said internal sleeve 62 in opposition to a spring 63. The valve 60 moves downward and away from frustro-conical seat 67, compressing spring 63 and also spring 64. Spring 64 is mounted on the outer periphery of internal sleeve 62. Spring 64 operates between the valve 60 and sleeve seat 66. Sleeve seat 66 is directly connected to a cylinder 65 which is a portion of the end plug 68. End plug 68 threadedly engages the housing 56 at its lower extremity and holds the spring-operated valve in position. The front brake outlet 59 is in communication with a chamber below the spring-operated valve. This outlet 59 is in communication with the inlet 57 when a predetermined air pressure is allowed to enter the inlet 57.

Fig. 3 illustrates the cross section of the air-operated hydraulic master cylinder. Both the front and rear air-operated hydraulic master cylinders are of the type disclosed. These master cylinders are connected to the pressure distribution valve 28 by a conduit means for carrying air pressure. The hydraulic fluid which is displaced in this master cylinder discharges through hydraulic outlet 81 through a fixture 82 through conduit means 33 or 32 to the front or rear hydraulic wheel cylinder. The air pressure inlet is shown by the conduit 73 which enters the end plate 72 of the air-operated piston 71. Piston 71 operates within a cylinder 70 which is provided with a venting means 69. Air piston 71 is directly connected to hydraulic piston 74 by means of rod 78. Piston 74 operates within the cylinder 75 in opposition to a spring 80. A venting means 76 is also provided between the hydraulic cylinder 75 and the reservoir 79. A plug 77 is provided on the top of the reservoir 79 for filling said reservoir 79 and cylinder 75.

Figure 4:
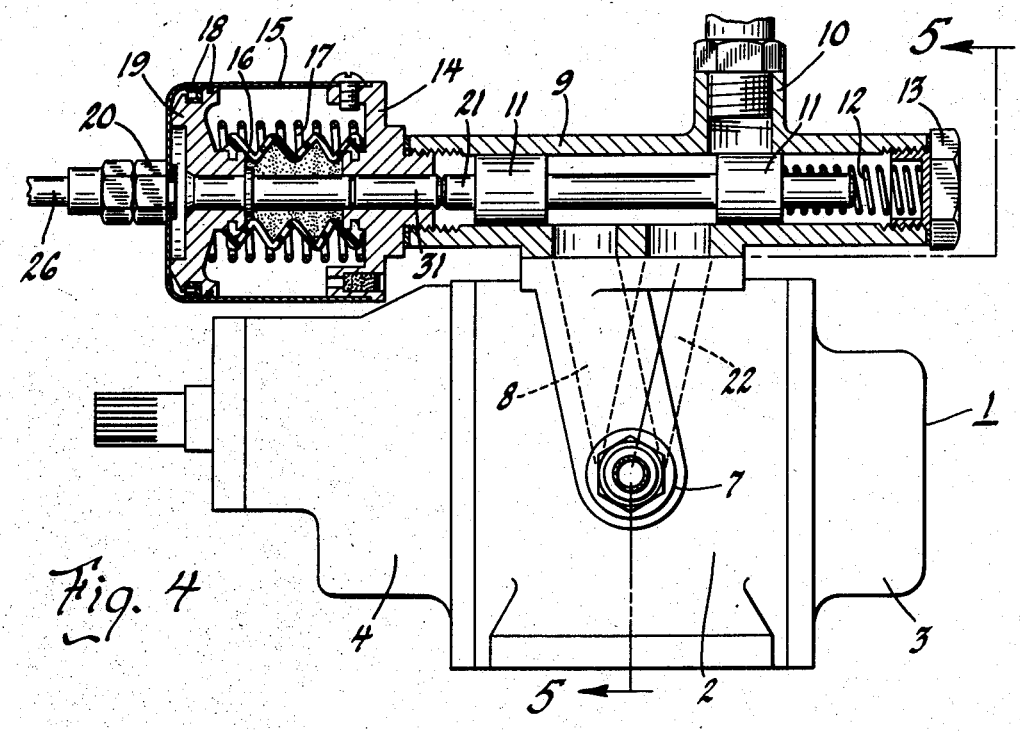
Fig. 4 is a side view of the fluid pump and a cross section of the dashpot and control valves for said fluid pump.

Fig. 4 shows the dashpot control of the by-pass valve which is mounted on pump 1. The air reservoir 23 is connected through conduit means 24 and 26 to a dashpot when treadle valve 27 is in an open position. The air pressure then is allowed to flow through conduit 26 to the fixture 20. Fixture 20 is mounted on the end of dashpot 15. Within the dashpot 15 piston 19 reciprocates when air pressure is applied through fitting 20. A seal 18 is also mounted on the outer periphery of piston 19 and for slidably engaging the internal periphery of the dashpot 15. This piston 19 operates in opposition to spring 17. Spring 17 operates between the piston 19 and the dashpot mounting 14. Mounted internally of spring 17 is a bellows 16. This bellows 16 together with spring 17 provides a cushioned and dampened movement of piston 19. The piston 19 is also directly connected to a rod 31, said rod extending through the dashpot mounting 14 to the rod 21. Valve 11 is comprised of two cylindrical portions mounted on rod 21 which provide for the closing of feed pipe 10 or the by-pass return 8, depending upon the position of valve 11. Valve 11 also operates within the cylinder 9. A spring 12 biases the valve 11 to the closed position in regard to feed pipe 10. An end plug 13 threadedly engages the cylinder 9 and supports one end of spring 12. The opposite end of spring 12 receives the end of rod 21 and abuts the end of the cylindrical portion of valve 11. This valve arrangement is mounted all within the cylinder 9 which, in turn, is mounted on the housing 2 of pump 1. End plates 3 and 4 are mounted on the ends of said housing 2.

Figure 5:
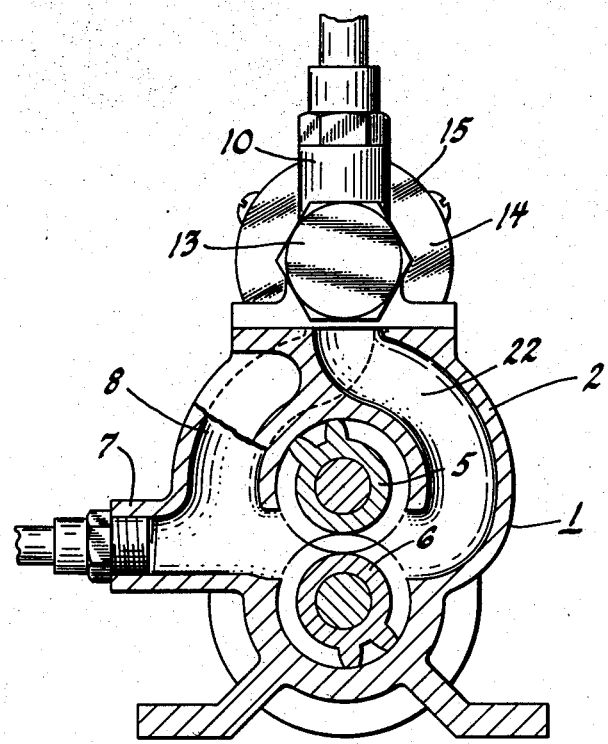
Fig. 5 is a cross-section end view of the hydraulic pump showing an end view of the control valve means.

Fig. 5 illustrates a cross-sectional end view of the fluid pump. The pumping of the fluid is done by means of rotating gears 5 and 6. Fluid pump 1 is driven by the output of the transmission and pump 39 is driven by the engine. When the valve 11 has closed the feed pipe 10, the fluid passes through the outlet passage 22 between the two cylindrical valve portions 11 and directly into the by-pass return passage 8. When the valve is in the open position and the fluid passes through the feed pipe 10, it returns through return pipe 7.

Fig. 6 is a schematic diagram of the torque converter. This torque converter is indicated at 47 on the schematic layout of Fig. 1. The torque converter 47 is connected to valve 88 by conduit 86. The torque transfer mechanism is controlled by means of pressure-regulating valve 88. The front pump 87 is connected to the transmission reservoir 84 by a conduit means. Pump 87 pumps directly through a conduit into a valve 88. A rear pump 90 also is connected by a conduit means to the reservoir 84 and pumps into a conduit means through valve 88. Reference may be had to a general type of operation of these two pumps in Patent 2,691,903. A check valve 89 is placed between the rear pump 90 and pressure-regulating valve 88 in the conduit means. The torque converter 47 is connected through the passages 48 and 49 to heat exchanger and returning to the transmission reservoir 84.

Fig. 7 illustrates the force circulating means of a hydraulic lubricating and cooling fluid for the differential. This view also discloses the transmission and torque converter as connected to the heat exchanger by means of conduits 48 and 49. The transmission reservoir 84 is shown on the lower portion of the transmission. Pump 39 pumps directly from the reservoir 84. This pump 39 feeds into conduit 37 through inlet conduit means 95 and 96. The inlet tubes 95 and 96 feed directly onto the pinion gear 99 and differential gear 102, providing cooling and lubrication of said gears. The inlets also feed directly on bearings 98 and 101 to also provide cooling and lubrication of said bearings. The air pressure conduit line 25 also feeds into a conduit line 93. Conduit line 93 feeds into the differential. A pressure-regulating valve 92 is inserted in the connection between the conduit line 93 and 25. Provisions are also made for a relief valve as disclosed at 91. The pressure-regulating valve 92 provides for a reduction of air pressure at this point. The air pressure feeding into the differential varies between 3 to 5 lbs. and provides the scavenging means for the cooling and lubricating means within the differential. The outlet for the cooling and lubricating fluid is shown at 94. This oil return line connects the differential with the reservoir.

The following description is for the operation of the combination fluid systems. The brake pedal 27 is depressed to provide actuation of the brakes. The air pressure reservoir 23 is directly connected to the brake pedal valve 27 by means of a pressure line 24. When the brake pedal valve 27 is opened, the air pressure is allowed to pass into the pressure distribution valve 28. If a small degree of braking is desired, the air will pass directly through the pressure distribution valve to the air operated hydraulic cylinder 29. As the air-operated hydraulic cylinder is actuated, the fluid in the master brake cylinder is displaced. The fluid enters fluid line 32 and passes on through to actuate the rear wheel brakes. If a greater degree of braking is desired, the brake pedal valve 27 is further depressed. This, in turn, creates a greater pressure within the pressure distribution valve 28. The greater pressure within this valve actuates the valve 60 thereby allowing air to enter the chamber immediately below the valve. As the air enters the chamber below the valve, it immediately escapes through the front brake outlet 59 into the conduit line 36. The pressure in the fluid line 33 actuates the front wheel brakes in proportion to the degree of the opening of the brake actuating member 27.

As the brake pedal valve 27 is opened, it also allows air to pass into the air pressure line 26. The air pressure in the air pressure line 26 enters through fitting 20 into dashpot 15 thereby actuating the dashpot and moving the control valve 11. As control valve 11 moves away from the dashpot mounting 14, the by-pass valve is closed and the cooling fluid is forced to circulate into the feed pipe 10. Feed pipe 10 leads into a conduit through the filter 40 and then on into the rear wheel brakes. The return passage 42 conducts the fluid into the heat exchanger 43. Further conduit means 44 are provided from the heat exchanger 43 for returning the fluid to the reservoir 45. By the above means of controlling the circulation through the brakes for cooling, the cooling is effected only at the time the brakes are actuated.

The heat exchanger 43 also provides for the circulation of a radiator fluid which is shown by conduit 50 and 51 directly connecting the radiator 52.

The pump 39 pumps directly out of the transmission reservoir through conduit means 37 and 38 into the differential, transmission and torque converter. The fluid is pumped directly onto the bearings and meshing gears to provide cooling and lubrication of said moving parts. This pump 39 is directly connected to the engine 53 to provide cooling and lubrication when the engine is operating.

The air reservoir is directly connected with the pressure regulating valve 92. The air pressure at this point is reduced to 3 to 5 lbs. per sq. in. as it enters the differential housing. The continual pressure within the differential housing forces any cooling or lubricating fluid which may be present in the housing to return through conduit 94 which directly connects the differential to the transmission reservoir 84.

In operation, the above controls and hydraulic systems provide for variable control of braking effort on the front and rear wheels. It provides for air-operated hydraulic master cylinders. The controls provide for forced circulation of a cooling medium to the rear brakes only at the time the brakes are being actuated. It also provides for a forced circulation of a cooling and lubricating fluid through the differential. The systems and controls also provide for two reservoirs for all systems and a common cooling device for the fluids circulated through all of the systems.

While the embodiments of the present invention as herein disclosed constitute a preferred form, it is to be understood that other forms might be adopted.

What is claimed is as follows:

1. In a fluid vehicle cooling system the combination of a fluid actuated and cooled brake comprising; an air reservoir, a treadle air control valve, conduit means connecting said reservoir to said treadle air control valve, an air proportion valve, air-operated hydraulic master cylinders, conduit means connecting said air control valve with said air proportioning valve and said air-operated hydraulic master cylinders, a braking means, fluid conduit means connecting said braking means with said hydraulic master cylinder, a fluid-cooling system comprising a fluid pump with a control valve, a reservoir, a filter, and a heat exchanger, conduit means connecting said fluid pump, said braking means, said filter, said heat exchanger, and said reservoir, a differential, transmission, and torque converter cooling and lubricating system comprising, a second reservoir, a second pump, a differential, a transmission, and a torque converter, conduit means connecting said parts of said lubricating and cooling system, air conduit means for connecting said pump air control valve to said air reservoir through said treadle air control valve to provide cooling of said brake when said brakes are actuated.

2. In a fluid vehicle cooling system the combination of an air-actuated hydraulic brake system comprising; an air reservoir, an air control valve, a pressure distribution valve, air-operated hydraulic master cylinders all connected by an air conduit means, a fluid brake, a hydraulic fluid conduit means connecting said master cylinders to said fluid brake, a brake cooling system comprising a fluid pump with an air control valve said control valve connected to said air reservoir through said foot pedal air control valve, a heat transfer device, a reservoir, conduit means connecting said fluid pump to said brakes, said heat exchanger, and said reservoir to provide circulation of a cooling fluid when said brakes are actuated, a transmission and torque converter, a second reservoir, a second pump, conduit means connecting said second reservoir, said second pump, said transmission and torque converter to said heat exchanger to provide cooling of said transmission and torque converter, a differential cooling system comprising said second pump, a differential, said second reservoir, conduit means connecting said second pump with said differential and said second reservoir to provide circulation of a fluid medium for the cooling of said differential, a control means for said differential comprising, a pressure-regulating valve connected to said air reservoir and said differential by a conduit means and thereby providing a constant pressure within said differential and to provide scavening of said cooling fluid within said differential.

3. In a fluid cooling system with air control means comprising; an air reservoir, a foot pedal control valve, an air distribution valve, air-operated hydraulic master cylinders, conduit means connecting said reservoir to said foot pedal control valve, said air distribution valve, and said air-operated hydraulic master cylinders, a braking means, fluid conduit means connecting said hydraulic master cylinders to said braking means, a differential cooling system comprising a pump, a reservoir, a differential, conduit means connecting said pump, said differential and said reservoir, a brake cooling fluid system comprising a pump with an air control valve, a heat exchanger, a second reservoir, conduit means connecting said pump with said brakes, said heat exchanger, and said second reservoir, air conduit means connecting said air reservoir to said second pump control valve to provide circulation of the cooling fluid when said brakes are actuated, air conduit means connecting said differential to said air reservoir, a pressure regulating valve in said air conduit means to provide scavenging of said differential.

4. In a vehicle fluid cooling system having air control means comprising in combination; an air reservoir, a foot pedal control valve, an air distribution valve, air-operated hydraulic master cylinders, conduit means connecting said reservoir, said foot pedal control valve, said air distribution valve, and said air-operated hydraulic master cylinders, a braking means, conduit means connecting said hydraulic master cylinders to said braking means, a differential cooling system comprising a pump, a reservoir, a heat transfer means, and a differential, conduit means connecting said differential, said reservoir, said heat transfer means, and said pump, an air conduit means connecting said air reservoir to said differential, an air-regulating valve in said air conduit means for providing a reduced air pressure within said differential and thereby providing a scavenging means for said differential, a brake cooling system comprising a second reservoir, a filtering means, a pump with an air control valve, a heat transfer means, and braking means, conduit means connecting said pump, said filter, said reservoir, said heat transfer means, and said braking means, an air conduit means connected between said air distribution valve and said foot pedal control valve and said second air pump control valve to provide circulation of the cooling brake fluid when said brakes are applied, a vehicle radiator, conduit means connecting said heat transfer means with said radiator to provide cooling of all fluid systems.

5. In a vehicle fluid cooling system with air control means, comprising in combination; an air reservoir, a foot pedal control valve, an air distribution valve, air-operated hydraulic master cylinders, conduit means connecting said reservoir to said foot pedal control valve, said air distribution valve, and said air-operated hydraulic master cylinders, a braking means, fluid conduit means connecting said hydraulic master cylinders to said braking means, a fluid cooling system for the braking means comprising a pump with a dashpot air control valve, a filter, a heat exchanger, and a reservoir, conduit means connecting said parts of brake cooling system to said braking means, an air conduit means connecting said foot pedal air control valve with said dashpot air control valve to provide circulation of cooling fluid to said brakes only upon actuation of said braking means, a differential, transmission and torque converter cooling and lubrication system comprising a pump, a reservoir, a differential, a transmission, a torque converter, a heat exchanger, conduit means connecting said parts of said differential, transmission, and torque converter cooling system, air conduit means connecting said air reservoir to said differential, an air pressure reducing and regulating valve in said air conduit means to provide a low air pressure within the differential and thereby produce scavenging of said differential.

6. In a vehicle fluid cooling system with air control means comprising in combination; a fluid brake, air operated hydraulic master cylinders with conduit means connected to said fluid brake, a fluid cooling system for said brake comprising a pump with an air control valve, a filter, a heat exchanger, a reservoir, conduit means connecting said parts of said brake cooling system to said fluid brake, a differential, transmission, and torque converter lubricating and cooling system comprising, a second pump, a heat exchanger, a second reservoir, a differential, a transmission, a torque converter, conduit means connecting said parts of said differential, transmission, and torque converter lubricating and cooling system, an air reservoir, a treadle air control valve, an air distribution valve, conduit means for connecting said air reservoir with said control valve, and said air operated hydraulic master cylinder, said distribution valve, a pressure-regulating valve, conduit means connecting said reservoir with said pressure-regulating valve and said differential for providing scavenging of said differential, conduit means connecting said treadle air control valve to said pump air control valve, said air control valve to provide circulation of the brake cooling fluid upon actuation of said fluid brake.

References Cited in the file of this patent

UNITED STATES PATENTS

| | | |
|---|---|---|
| 2,691,903 | McRae | Oct. 19, 1954 |
| 2,736,412 | Livezey | Feb. 28, 1956 |
| 2,788,870 | Heck | Apr. 16, 1957 |
| 2,818,708 | Kelley | Jan. 7, 1958 |
| 2,832,429 | Kelley et al. | Apr. 29, 1958 |